(12) United States Patent
Mattes et al.

(10) Patent No.: US 11,993,007 B2
(45) Date of Patent: May 28, 2024

(54) MEASURING SYSTEM FOR A DEVICE FOR THE GENERATIVE MANUFACTURING OF A THREE-DIMENSIONAL OBJECT

(71) Applicant: EOS GmbH Electro Optical Systems, Krailling (DE)

(72) Inventors: Thomas Mattes, Gilching (DE); Jochen Philippi, Gräfelfing (DE)

(73) Assignee: EOS GmbH Electro Optical Systems, Krailling (DE)

( * ) Notice: Subject to any disclaimer, the term of this patent is extended or adjusted under 35 U.S.C. 154(b) by 722 days.

(21) Appl. No.: 16/624,363

(22) PCT Filed: Jun. 26, 2018

(86) PCT No.: PCT/EP2018/067170
§ 371 (c)(1),
(2) Date: Dec. 19, 2019

(87) PCT Pub. No.: WO2019/002325
PCT Pub. Date: Jan. 3, 2019

(65) Prior Publication Data
US 2021/0146624 A1 May 20, 2021

(30) Foreign Application Priority Data
Jun. 28, 2017 (DE) ..................... 10 2017 210 994.7

(51) Int. Cl.
*B29C 64/153* (2017.01)
*B22F 12/45* (2021.01)
(Continued)

(52) U.S. Cl.
CPC ............ *B29C 64/153* (2017.08); *B22F 12/45* (2021.01); *B22F 12/90* (2021.01); *B29C 64/268* (2017.08);
(Continued)

(58) Field of Classification Search
CPC ... B29C 64/393; B29C 64/153; B29C 64/268; B33Y 10/00; B33Y 30/00; B33Y 50/02
See application file for complete search history.

(56) References Cited

U.S. PATENT DOCUMENTS 7,847,212 B2    12/2010  Renz et al.
2004/0200816 A1*  10/2004  Chung ............... G05D 23/1919
                                                            219/121.83
(Continued)

FOREIGN PATENT DOCUMENTS

CN    102555434    7/2012
CN    106626378    5/2017
(Continued)

OTHER PUBLICATIONS

Machine translation of CN106363171B (Year: 2016).*
International Search Report for Application No. PCT/EP2018/067170, dated Oct. 4, 2018, 2 pages.

*Primary Examiner* — Timothy Kennedy
*Assistant Examiner* — John Robitaille
(74) *Attorney, Agent, or Firm* — Polsinelli (57) ABSTRACT

A measuring system serves for equipping or retrofitting a device for manufacturing a three-dimensional object by selective layerwise solidification of a building material. The device includes an irradiator for selectively irradiating a layer of the building material applied in a working plane of the device at locations corresponding to a cross-section of the object to be manufactured. The irradiator includes at least two irradiation units, and each irradiation unit can be projected onto a pixel in the working plane and can be at least switched on and off. The measuring system includes at least one camera for determining and evaluating the radiation emitted by the irradiator and/or the position and/or orientation of the irradiation unit(s) in absolute and/or relative to one another, and at least one distance sensor for (Continued)

detecting an extension in a direction (z) perpendicular to the working plane.

9 Claims, 3 Drawing Sheets

(51) Int. Cl.

| | | |
|---|---|---|
| *B22F 12/90* | (2021.01) | |
| *B29C 64/268* | (2017.01) | |
| *B29C 64/393* | (2017.01) | |
| *B33Y 10/00* | (2015.01) | |
| *B33Y 30/00* | (2015.01) | |
| *B33Y 50/02* | (2015.01) | |
| *B22F 10/28* | (2021.01) | |
| *B22F 10/36* | (2021.01) | |
| *B22F 12/13* | (2021.01) | |
| *B22F 12/41* | (2021.01) | |
| *B22F 12/49* | (2021.01) | |
| *B22F 12/63* | (2021.01) | |

(52) U.S. Cl.
CPC .......... *B29C 64/393* (2017.08); *B33Y 10/00* (2014.12); *B33Y 30/00* (2014.12); *B33Y 50/02* (2014.12); *B22F 10/28* (2021.01); *B22F 10/36* (2021.01); *B22F 12/13* (2021.01); *B22F 12/41* (2021.01); *B22F 12/49* (2021.01); *B22F 12/63* (2021.01)

(56) References Cited

U.S. PATENT DOCUMENTS

| | | | |
|---|---|---|---|
| 2008/0015553 A1* | 1/2008 | Zacharias | A61F 9/008 606/4 |
| 2011/0309554 A1 | 12/2011 | Liska et al. | |
| 2012/0206720 A1* | 8/2012 | Fosel | G01J 1/4257 356/217 |
| 2015/0155490 A1 | 6/2015 | Ryu et al. | |

FOREIGN PATENT DOCUMENTS

| | | | |
|---|---|---|---|
| CN | 106363171 B | * | 3/2019 |
| WO | 03097290 | | 11/2003 |
| WO | 2010045951 | | 4/2010 |
| WO | 2015091485 | | 6/2015 |
| WO | 2016094827 | | 6/2016 |
| WO | 2017079091 | | 5/2017 |

* cited by examiner

MEASURING SYSTEM FOR A DEVICE FOR THE GENERATIVE MANUFACTURING OF A THREE-DIMENSIONAL OBJECT

The present invention relates to a measuring system for a device for the generative manufacturing of a three-dimensional object by the layerwise application and selective solidification of a building material, preferably a powder.

TECHNICAL FIELD OF THE INVENTION

Devices and methods of this kind are used, for example, in rapid prototyping, rapid tooling or additive manufacturing. An example of such a method is known as "selective laser sintering or laser melting". Therein, a thin layer of a powdery building material is repeatedly applied and the building material is selectively solidified in each layer by selective irradiation of locations corresponding to a cross-section of the object to be produced with a laser beam.

BACKGROUND OF THE INVENTION

The selective irradiation of the applied powder layer can be carried out, for example, by means of a laser beam which is deflected by a deflecting device consisting, for example, of galvanometer mirrors in such a way that its point of impact on the powder surface is moved across the locations to be solidified.

As an alternative, WO 2015/091485 A1 discloses an irradiation device comprising a plurality of laser arrays. Each of these laser arrays is composed of a plurality of individual VCSELs (vertical cavity surface-emitting lasers), which are switched on or off together. The laser arrays are projected onto the powder surface using an optical element. By selectively switching the laser arrays on and off and moving the irradiation device in parallel to the powder surface, the entire powder layer can selectively be irradiated.

In order to make sure that the laser arrays are projected onto the powder surface with a sufficient accuracy and power uniformity, this projection has to be measurable with appropriate accuracy for calibration, adjustment and quality assurance purposes. Since such an irradiation device may consist of many hundreds or thousands of individual laser sources and these may possibly still be controlled with many different power values, a very high number of required individual measurements may result. A suitable measuring device therefore has to be designed in such a way that the measurements can largely be automatized as well as run sufficiently fast and at high frequency to avoid excessively long measurement times.

SUMMARY OF THE INVENTION

The object of the present invention is to provide a measuring device and a measuring method for a device for the generative manufacturing of a three-dimensional object by layerwise application and selective solidification of a building material, by which irradiation devices formed from a plurality of individual laser arrays can be measured quickly and automatically.

This task is solved by a measuring system according to claim 1, a device containing the measuring system according to claim 5 and a procedure for using the measuring system according to claims 9 and 14, respectively. Further developments of the invention are respectively indicated in the dependent claims. The method may also be further developed by the features of the devices described below or in the dependent claims, or vice versa, or the features of the devices may also be used together for further development.

The measuring system according to the invention serves for equipping or retrofitting a device for the manufacturing of a three-dimensional object by selective layerwise solidification of a building material. The device includes an irradiator for selectively irradiating a layer of the building material applied in a working plane of the device at locations corresponding to a cross-section of the object to be manufactured for solidifying the irradiated locations. The irradiator comprises at least two irradiation units, preferably laser arrays, and each irradiation unit can be projected onto a pixel in the working plane and can be at least switched on and off. The measuring system comprises at least one camera for detecting and evaluating the radiation emitted by the irradiator and/or the position and/or orientation of the irradiation unit(s) in absolute and/or relative to each other, and at least one distance sensor for detecting an extension perpendicular to the working plane. By combining different measuring means, in particular the camera and the distance sensor, measurements for calibrating the device may be carried out quickly, easily and automatically.

Preferably, the at least one camera and the at least one distance sensor are integrated in a single measuring device. Thus, for example, a simple handling and an easy mounting of the measuring system in a manufacturing device may be realized.

Preferably, the measuring system further comprises at least one power measuring device for determining a radiation power of the irradiator and/or of at least one irradiation unit. Thus, for example, the emitted radiation power may be determined simultaneously during the measurements performed by the measuring system.

Preferably, the measuring system comprises at least one switch configured to avoid a collision of the irradiator and/or a recoater further included in the device with the measuring system. This may prevent damage to the device and/or the measuring system, for example.

Preferably the camera comprises a CMOS sensor and/or a CCD sensor, and/or the power measurement device comprises a photodiode and/or a photo resistor, preferably integrated in an Ulbricht sphere. In this way, for example, an optical measurement and possibly subsequent image processing may be carried out.

The device according to the invention serves for the manufacturing of a three-dimensional object by selective layerwise solidification of a building material. The device comprises an irradiator for selectively solidifying a layer of the building material applied in a working plane of the device at locations corresponding to a cross-section of the object to be manufactured, the irradiator comprising at least two irradiation units, preferably laser arrays, each irradiation unit being projectable onto a pixel in the working plane and being at least switchable on and off. The device is configured and/or controlled to repeat the application and selective solidification steps until the object is completed. The device also contains a measuring system according to the invention. By combining the device with the measuring system according to the invention, for example, measurements for the calibration of the device can be carried out quickly, easily and automatically.

Preferably the irradiation units are arranged in modules and/or the modules are arranged in cascades and/or the irradiation units are formed as laser arrays, wherein the lasers of the laser array are preferably VCSEL or VECSEL. Thus, for example, a line irradiator may be easily realized.

Preferably, a holding device which is movable in the moving direction of the irradiator and in a direction perpendicular to the working plane is arranged in the device, and the measuring system is arranged on the holding device so as to be movable in a direction perpendicular to these two directions. This allows, for example, simple positioning of the measuring system within the device.

Preferably the measuring system and/or the holding device can be removed from the device. Thereby, for example, the measuring system and/or the holding device may be removed from the device for the manufacturing of an object and thus hinder the production process less.

The first method according to the invention consists in using a measuring system according to the invention in a device according to the invention. A recoater is aligned with the device and/or the irradiator and/or the measuring system and/or with reference to a reference plane of the device. This allows, for example, calibration or adjustment of the individual components to each other when the device is put into operation.

Preferably, at least one reference plane of the recoater and/or of the irradiator and/or of the measuring system and/or of the device is determined. A reference plane of the recoater is preferably a recoating plane and/or a reference plane of the irradiator is preferably a mean focal plane of the irradiation units. Thus, for example, a relative position of the reference planes to each other may be determined.

Preferably, an alignment of the irradiator and/or a determination of the focal plane of the irradiator is carried out on the basis of determined sharpness values of individual irradiation units in different vertical positions and their position in an x/y plane. Thus, for example, the irradiation unit may be set to the desired position and orientation.

Preferably, the recoater and/or the irradiator is aligned on the basis of absolute z positions and/or angular positions around an x and/or y direction of the assigned reference plane(s). This allows, for example, an exact alignment of the recoater and/or irradiator on the basis of the coordination system of the device.

Preferably first a coarse alignment and then a fine alignment of the recoater and/or the irradiator and/or the measuring system is carried out. This makes it possible, for example, to align the recoater and/or irradiator more precisely.

The second method according to the invention consists in using a measuring system according to the invention in a device according to the invention. In this process, failed lasers or irradiation units and/or power levels of individual irradiation units are determined, in particular by means of the power measuring device. This makes it possible, for example, to check the function of the irradiator.

Preferably, an operating condition of the device as in its intended use is established before the measuring system is used. Thus, for example, a calibration or adjustment can be carried out in a state of the device which corresponds to a real production state.

BRIEF DESCRIPTION OF THE DRAWINGS

Further features and functionalities of the invention can be derived from the description of implementation examples on the basis of the attached drawings.

FIG. 2a is a schematic view of an irradiator included in the device shown in FIG. 1 from below.

FIG. 2b is a schematic view of a laser module included in the irradiator shown in FIG. 2a.

FIG. 2c is a schematic view of a laser array included in the laser module shown in FIG. 2b.

DETAILED DESCRIPTION OF THE EMBODIMENTS

Figure 1:
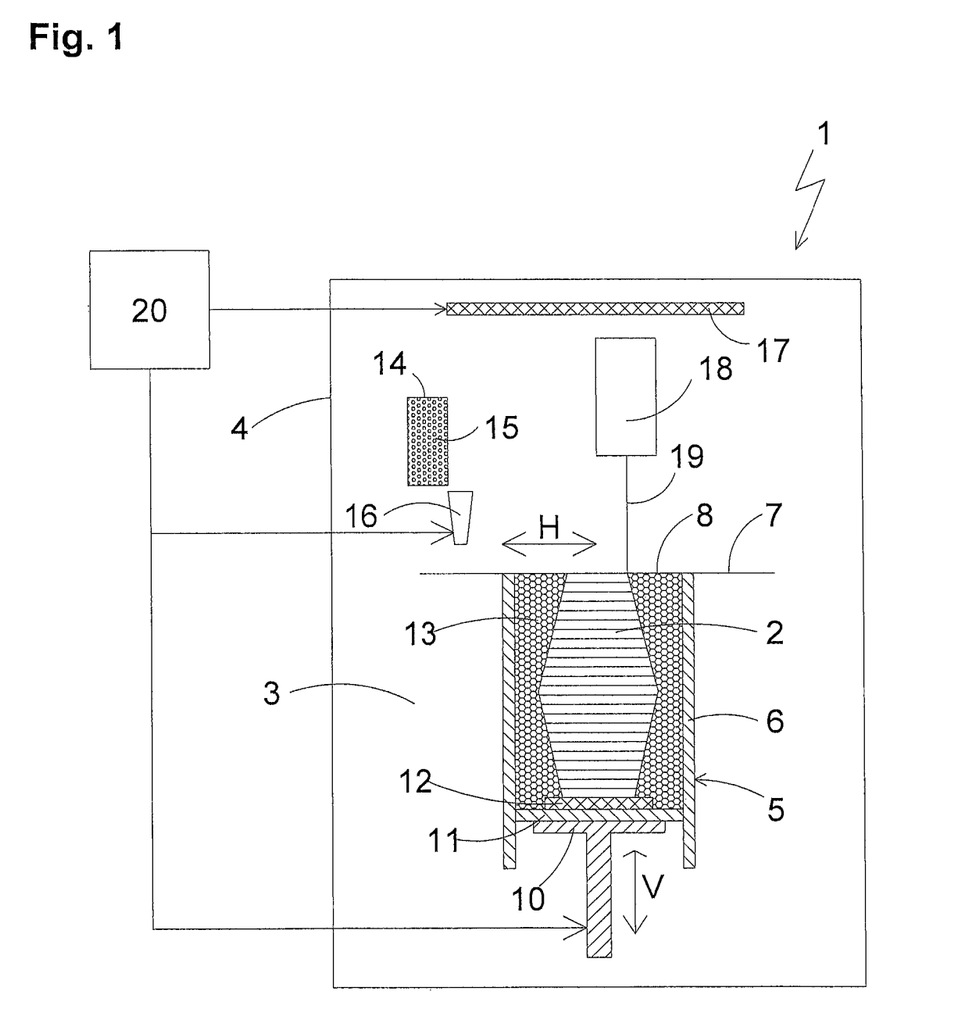
FIG. 1 is a schematic view shown partially in section of an embodiment of a device for the layerwise manufacturing of a three-dimensional object to which the present invention is applicable.

In the following, an embodiment of a device which is suitable for carrying out the present invention will be described with reference to FIG. 1. The device illustrated in FIG. 1 is a laser sintering or laser melting device 1. For building the object 2, it includes a processing chamber 3 having a chamber wall 4.

A container 5, which is open at the top and which has a container wall 6, is arranged in the processing chamber 3. By the upper opening of the container 5, a working plane 7 is defined, wherein the portion of the working plane 7 lying within the opening that can be used for building the object 2 is referred to as a build area 8.

In the container 5, a support 10 is disposed which is movable in a vertical direction V and onto which a base plate 11 is attached which closes the container 5 towards the bottom and thus forms the base of the latter. The base plate 11 may be a plate which is formed separately from the support 10 and which is attached to the support 10, or it may be formed so as to be integral with the support 10. Depending on the powder and process used, a building platform 12 may also be attached to the base plate 11 as a building base on which the object 2 is build. However, the object 2 may also be built on the base plate 11 which then itself serves as the building base.

In FIG. 1 the object 2 which is to be formed in the container 5 on the building platform 12 is illustrated below the working plane 7 in an intermediate state, having a plurality of solidified layers and being surrounded by remaining non-solidified building material 13.

The laser sintering device 1 further comprises a storage container 14 for a pulverulent building material 15 which can be solidified by electromagnetic radiation, and a recoater 16 which is movable in a horizontal direction H for applying the building material 15 within the build area 8. Preferably, the recoater 16 extends across the entire area to be applied in a direction traverse to its moving direction.

Optionally, a radiation heater 17 for heating the applied building material 15 is arranged in the processing chamber 3. An infrared lamp may for example be provided as a radiation heater.

The laser sintering device 1 further comprises an irradiator 18 which is also movable in a horizontal direction H and generates a laser beam 19 which is focused onto the working plane 7. The irradiator 15 is preferably designed as a line irradiator which is capable of irradiating a line which extends transversely to its moving direction and which extends over the entire area to be irradiated.

The laser sintering device 1 further comprises a control unit 20 by way of which the individual component parts of the device are controlled in a coordinated manner for carrying out the building process. As an alternative, the control unit may partially or entirely be arranged outside of the device. The control unit may include a CPU, the operation of which is controlled by a computer program (software). The computer program may be stored on a storage medium separate from the device, from where it may be loaded into the device, especially into the control unit.

For applying a powder layer during the operation, the support 10 first is lowered by a height corresponding to the desired layer thickness. The recoater 16 is first moved to the storage container 14 and receives from it an amount of building material 15 which is sufficient for applying a layer. Then, it moves across the build area 8 where it applies a thin layer of the pulverulent building material 15 onto the building base or a previously applied powder layer. The application is carried out at least across the entire cross-section of the object 2 to be produced, preferably across the entire build area 8, i.e. the area delimited by the container wall 6. Optionally, the pulverulent building material 15 is heated by means of the radiation heater 17 to a working temperature.

The irradiator 18 then moves across the applied and preheated powder layer and solidifies the powdery building material 15 at the locations corresponding to the cross-section of the object 2 to be produced by selectively irradiating these locations with the laser beam 19. The powder grains at these locations are partially or completely melted by the energy introduced by the radiation so that after cooling, they are agglutinated to each other to form a solid body. These steps are repeated until the object 2 is completed and can be removed from the process chamber 3.

The irradiation of the locations to be solidified is preferably carried out in such a way that the irradiator travels in one direction across the build area and irradiates all the locations of the powder layer to be solidified that lie below the current position of the irradiator simultaneously. For this purpose, the irradiator has to be equipped to generate different irradiation profiles in the direction transverse to the irradiation direction. In the present embodiment, this is achieved by a number of independently controllable irradiation units.

Figure 2:
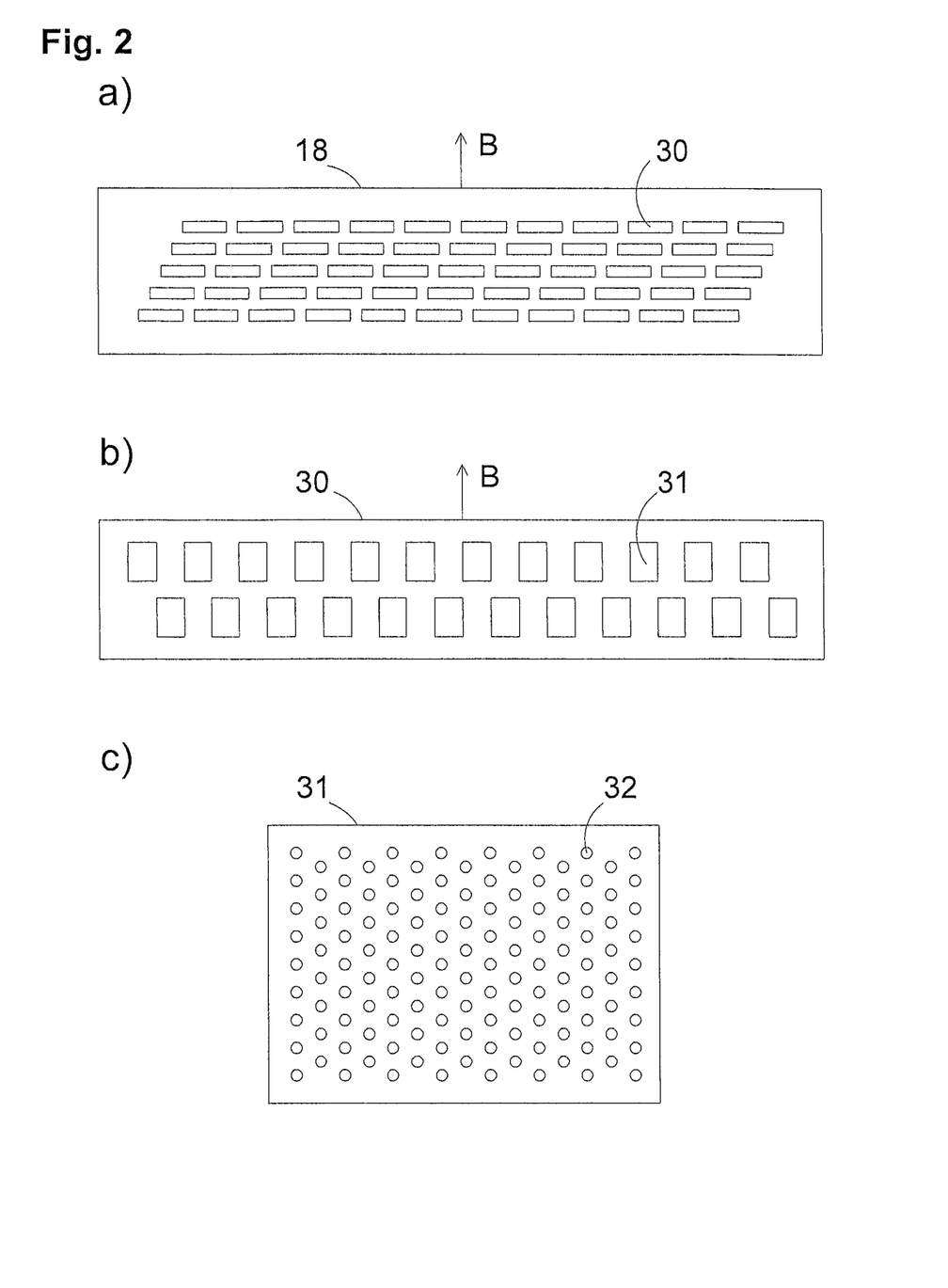

FIG. 2 schematically shows a view of the irradiator 18 from below. The moving direction of the irradiator across the build area here is indicated by an arrow B. FIG. 2a shows how a number of laser modules 30 are arranged in rows offset from each other on the underside of the irradiator 18. FIG. 2b shows how each laser module 30 is formed from a plurality of laser arrays 31. FIG. 2c shows how each laser array 31 is formed from a plurality of individual lasers 32.

The individual lasers 32 are configured as semiconductor diode lasers of the type VCSEL (vertical cavity surface-emitting laser) or VECSEL (Vertical External Cavity Surface Emitting Laser). These laser sources have a beam direction perpendicular to the main extension (wafer plane) and a circular symmetric beam divergence and they are particularly suitable for the arrangement in two-dimensional arrays. In the laser array 31 shown in FIG. 2c, the individual lasers 32 are arranged in a hexagonal manner, but any other arrangement is possible. All the lasers 32 of a laser array 31 are preferably controlled simultaneously. The smallest individually controllable irradiation unit of the irradiator 18 is the laser array 31. This has the advantage that in the case of a failure of a single laser, it is not one complete irradiation unit that immediately fails, but the power drop can be compensated by the other lasers of the laser array.

Multiple laser arrays 31 are combined to a laser module 30. For each laser module 30, an optical element (not shown in the figure) is also provided for projecting the laser arrays 31 onto the working plane 7. Each laser array 31 is mapped onto a pixel in the working plane 7. Each laser module 30 is directed to a specific area in working plane 7. If the irradiator is moved in its moving direction B, the pixels of the switched-on laser arrays 31 form a track.

In the laser module 30 shown in FIG. 2b, the individual laser arrays 31 are arranged in two staggered rows in such a way that the tracks of their pixels in the working plane are adjacent to each other when the laser module 30 is moved in the moving direction B. If, for example, the laser arrays 31 have a width of 0.1 mm transverse to the direction of movement and the optical component has a reducing scale of 1:5, the adjoining tracks of the laser arrays 31 have a width of 0.02 mm. In other words, the irradiator 18 has a resolution of 0.02 mm in a direction transversal to its moving direction B.

To utilize the entire width of the irradiator 18, multiple laser modules 30 are arranged in a row in the direction transversal to the moving direction B. Due to the optical reduction of the laser modules 30 by the optical element, the sum of the widths of a track formed from the pixels of all laser arrays 31 of the laser module 30 during a movement of a laser module 30 in the moving direction B is narrower by the reduction scale than the laser module 30 itself. However, the pitch of the tracks of all laser modules in a row, i.e. the center distance of the tracks to each other, corresponds to the (undiminished) pitch of the laser modules 30. Thus a non-irradiable area remains between the tracks which can be irradiated by a single row of laser modules 30.

In order to enable a continuous irradiation of the working plane in the direction transverse to the direction of movement B, several rows of laser modules 30 are arranged offset to each other. In other words, individual cascades of laser modules 30 are formed which lie behind each other in the moving direction F, but are offset from each other in the direction transverse to the moving direction. In FIG. 2a, for example, the laser modules 30 of the five rows located furthest to the left form a cascade. Several such cascades are then arranged next to each other in the direction transverse to the moving direction. Within each cascade, the laser modules 30 are arranged offset to each other to such an extent that the tracks of the pixels of their laser arrays 31 are adjacent to each other.

In an exemplary implementation form the irradiator contains 108 laser modules, each laser module contains 32 laser arrays, and each laser array contains 282 VCSELs. This results in 3456 individually controllable irradiation units (laser arrays). If, for example, these are to be controllable in 61 power levels (from 0=off to 60=maximum power), over 200,000 measurements are required for a complete calibration or adjustment.

Such measurements may be necessary, for example, in the context of production-accompanying calibration/adjustment, production-accompanying quality assurance or periodic quality assurance by customers or service personnel. The measurements have to be carried out automatically, accurately and quickly, so that a measurement of an irradiator can be carried out with acceptable processing times and acceptable effort.

Figure 3:
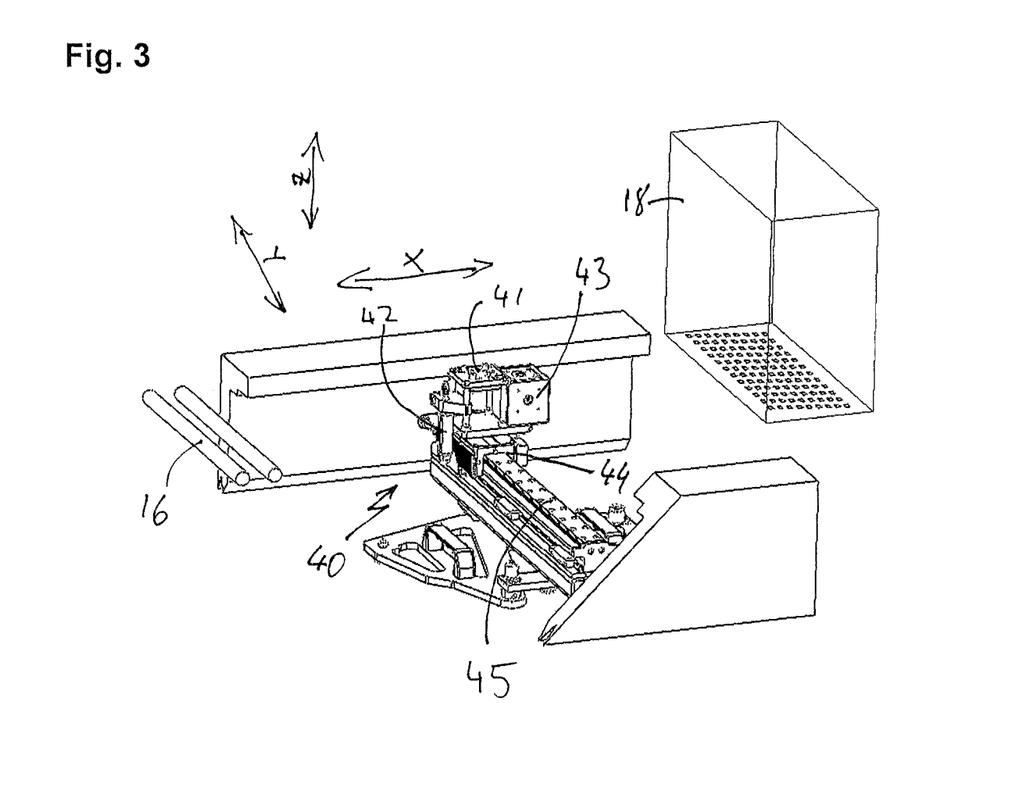
FIG. 3 is a schematic perspective view of a portion of the device shown in FIG. 1 with a measuring system according to an embodiment of the present invention.

FIG. 3 shows a simplified perspective view of a measuring device 40 which is suitable for equipping or retrofitting the laser sintering device 1. Parts of the laser sintering device 1 which are not necessary for describing the measuring device 40 and its use are omitted for the sake of clarity.

As shown in FIG. 3, a three-dimensional coordinate system of the device is defined as follows:

The x-direction is the direction in the working plane in which the recoater 16 and the irradiator 18 move across the working plane 7 of the device 1.

The y-direction is the direction in the working plane 7 which is perpendicular to the x-direction. In this direction, the longitudinal directions of recoater 16 and irradiator 18 extend.

The z-direction is the height direction in which the carrier 10 is moved. A movement in this direction changes the vertical distance to the recoater or irradiator.

The measuring device 40 comprises a camera 41, a distance sensor 42 and a power measuring device 43. These three components of the measuring device 40 are mounted in a fixed position relative to each other on a measuring head holder 44. Preferably the three components are arranged side by side in the x-direction with a minimum expansion in the y-direction.

The measuring head holder 44 is mounted movable in the y-direction on a y-positioning unit 45 which is attached to a (not shown) holding device arranged in the device 1 so that it can move in the x-direction and in the z-direction. Since the device 1 already contains drives for the movement of the recoater 16 and the irradiator 18 in the x-direction and for the movement of the carrier 10 in the z-direction, no separate drives are required for that purpose.

The holding device is arranged in the device 1 so that it can be removed from the device 1. Preferably, the measuring head holder 44 is also attached to the y-positioning unit 45 so that it can be removed from device 1. The holding device may for example be attached to the carrier 10 with magnets.

The measuring device 40 is aligned with the coordinate system of the machine by means of elements and methods known per se, such as levelling with respect to the working plane by means of three adjusting screws. A displacement measuring system is provided for all three directions so that the position of the measuring device can be determined and reproducibly adjusted.

The camera 41 serves for the acquisition of an optical image of the irradiator 18 from below, in particular of the laser arrays 31 and laser modules 30 in the light-emitting state. For this purpose, a camera lens 41 can be set in such a way that, for example, the laser array 31 to be observed is projected directly onto the image acquisition chip of the camera. However, a frosted glass pane can also be inserted in the plane in which the optical element of a laser module 30 images the laser array 31, and the resulting image can be imaged by the camera lens onto the image acquisition chip, or this real image can be mapped onto the image acquisition chip without the interposition of a frosted glass pane.

A CCD sensor or a CMOS sensor, for example, is used as an image acquisition chip. The sensor converts the received image into electrical signals, which can then be digitized, stored and processed.

The camera may also include holders for filters, for example for attenuating the laser power to a value suitable for the image acquisition chip.

The distance sensor 42 serves for determining the vertical distance (in the z-direction, i.e. perpendicular to the working plane) to an element located above the sensor. The measuring principle of the distance sensor may be formed mechanically by means of a button or contactless, for example inductive, capacitive or optical.

Typically, the distance sensor has a measuring range of a few mm. The resolution is preferably in the μm range, ideally 1 μm or better.

The power measuring device 43 is used to determine the radiation power emitted by one or more laser arrays 31. For this purpose, it contains a sensor that is capable of converting an optical power into an electrical signal that can then be digitized, stored and processed. For this purpose, the power measuring device 43 contains a photoelectric sensor, for example a photo resistor, a photodiode, or an OLPC sensor (Online Laser Power Control). This sensor is preferably integrated into an Ulbricht sphere which serves to collect the radiation emitted by the laser array.

Optionally, further elements are provided, such as limit switches, which preferably operate without contact and avoid a collision of the measuring device 40 with the recoater 16, the irradiator 18 or other components of device 1.

In the following, methods for the measurement, calibration and adjustment of the device 1 are described, in which the measuring device 40 is used.

After the installation of device 1, the relative position of the recoater 16 and the irradiator 18 is only insufficiently determined and known due to long mechanical tolerance chains. Therefore, it is necessary to align them relative to each other and to the device 1 before starting-up.

For this purpose, reference planes of the device 1, the recoater 16 and/or the irradiator 18 are preferably determined and brought into coincidence with each other or are at least aligned parallel to each other. As a reference plane of the device 1 the x/y plane at a constant z-position or the upper edge of the container 5 is used, for example. As a reference plane of the recoater 16, for example, a recoating plane is used which is determined by the extension of a lower edge of a recoating element of the recoater 16, e.g. a blade or a roller, in the y-direction and its displacement in the x-direction. As a reference plane of the irradiator 18, for example, a lower surface of an irradiation window terminating the irradiator downwards or a mean focal plane of the individual laser arrays 31 is used. The mean focal plane is taken into account because the focal planes of the individual laser arrays 31 may deviate slightly from each other due to tolerances.

Since the measuring device 40 in each case can only determine positions of the reference planes relative to each other, one plane has to be mechanically adjusted in advance. This may, for example, be the moving plane of the measuring device 40 itself or the reference plane of the recoater 16. This is done, for example, by aligning the recoater using feeler gauges parallel to the upper edge of the container 5.

The alignment of the reference planes to each other is carried out using absolute z positions and/or angular positions around an x and/or y direction of the individual reference planes.

The relative orientation between the reference planes of the measuring device 40 and the recoater 16 is determined by measuring the lower edge of the recoating element (or of the recoating elements, shown in FIG. 3 are two recoating rollers) at two positions as far apart as possible in the y-direction by means of the distance sensor 42. From these measured values a tilting of the two planes relative to each other about the x-axis can be determined and corrected if necessary. Tilting about the y-axis can be determined and corrected if the recoater 16 and the measuring device 40 are sufficiently moved in the x-direction and the measurement is repeated. If, however, the recoater 16 and the measuring device 40 are moved in the x-direction by the same drive, they automatically run in parallel and such a measurement is not required.

The adjustment of the irradiator 18 is preferably done in two steps. For a coarse alignment, at least three positions of the irradiation window that are as far apart as possible are measured by means of the distance sensor 42. From these measured values a tilting of the plane of the irradiation window can be determined and corrected if necessary.

For a fine adjustment, the mean focal plane of the irradiator 18 is used as a reference plane. This mean focal plane is determined on the basis of determined sharpness values of the imaging of individual irradiation units in different image planes perpendicular to the vertical z-axis and their position in an x/y plane. The measuring device 40 moves in the x and y direction to different positions below the irradiator 18. One (or more) laser arrays 31 are switched on, their imaging is evaluated with the camera 41 and the position of maximum sharpness is determined by moving the measuring device 40 in the z direction via the path measuring system of the z axis. From the differences of the z-positions a tilting of the mean focal plane can be determined and corrected if necessary. The same can be done for different positions of the irradiator 18 in the y-direction.

By moving the measuring device 40 in the x and y direction below the laser arrays 31 to be measured and determining the position of the image of the laser array 31 on the image acquisition sensor of the camera, deviations in the position of the laser arrays 31 can also be detected and corrected. Such deviations occur, for example, when the irradiator 18 is rotated around the z-axis.

In addition to the position and focal plane of each laser array 31, the failure of individual lasers 32 can also be determined from the image of the laser array 31.

Furthermore, the measuring device 40 can also determine the power output of the individual laser arrays 31. For this purpose, the power measuring device is placed below the laser array 31 to be measured and the laser array 31 is controlled by means of a pulse-width-modulated signal (PWM signal) in different power levels from off-state (PWM signal continuously off) to continuous operation (PWM signal continuously on). The dependency of the emitted light intensity on the PWM control can be recognized from the measurement results and corrected if necessary. Deviations result, for example, from a different efficiency of individual laser arrays, from non-linearities or from the failure of individual lasers of a module. In extreme cases, a laser array may have failed completely, which is then detected by the measuring device.

Such a measurement of the individual laser arrays 31 is not only useful during the start-up, but may also be carried out repeatedly during the operating time of device 1, preferably at predetermined time intervals or depending on the use of the device.

Before the measuring device 40 is used, an intended operating state of the device can be established, which corresponds, for example, to the irradiation case during the manufacturing of a three-dimensional object.

Instead of a movement of the irradiator in one moving direction and an extension of the irradiator in the transverse direction to the moving direction across the entire width of the build area to be irradiated, an irradiator with smaller dimensions may also be used, which is led across the build area in two dimensions. With the described measuring device a positioning accuracy of the irradiator in y-direction can then be determined and corrected if necessary.

Since the camera 41, the distance sensor 42 and the power measuring device 43 are mounted in a fixed positional relation to each other in the device, it is possible to carry out combined measurements of two of these measuring devices or of all the three measuring devices. Complex alignments of the measuring devices during the measuring process are no longer required, and the measuring results of the three measuring devices can be set in relation to each other accurately and reproducibly. This allows a fast, highly automated and customer-friendly measurement of all relevant performance data of the irradiator in a simple way and can be used for calibration, adjustment, documentation and maintenance purposes.

The measuring device 40 may be implemented as a measuring system with components provided separately from each other, but the components may also be integrated in a single measuring device.

Even if the present invention has been described using a laser sintering or laser melting device, it is not limited to laser sintering or laser melting. It can be applied to any method for the generative manufacturing of a three-dimensional object by layerwise application and selective solidification of a building material, in which the energy required for the solidification of the building material is introduced into the building material in the form of radiation. In general, any device can be used as an irradiator by which energy in the form of wave or particle radiation can be selectively applied to a layer of the building material.

Various materials can be used as building materials, preferably powders, in particular metal powders, plastic powders, ceramic powders, sand, filled or mixed powders.

The invention claimed is:

1. A measuring system for equipping or retrofitting a device for manufacturing a three-dimensional object by selective layerwise solidification of a building material, wherein the device includes an irradiator for selectively irradiating a layer of the building material applied in a working plane of the device at locations corresponding to a cross-section of the object to be manufactured to thereby solidify the irradiated locations, the irradiator including at least two irradiation units, the measuring system comprises:
   a positioning unit and a measuring head holder movably mounted on the positioning unit;
   at least one camera for capturing an image of an element located above the camera and for determining and evaluating radiation emitted by the irradiator and/or the position and/or orientation of the at least one of the irradiation units in absolute and/or relative to one another; and
   at least one distance sensor for determining a vertical distance to an element located above the distance sensor,
   wherein the at least one camera and the at least one distance sensor are mounted in a fixed position relative to one another on the measuring head holder.

2. The measuring system according to claim 1, further comprising at least one power measuring device for determining a radiation power of the irradiator and/or of at least one irradiation units.

3. The measuring system according to claim 1, wherein the device further includes a recoater, and further comprising at least one switch that is designed to avoid a collision of the irradiator and the a recoater.

4. The measuring system according to claim 1, wherein:
   the camera comprises a CMOS sensor and/or a CCD sensor, and/or
   the power measuring device comprises a photodiode and/or a photo resistor.

5. The measuring system according to claim 1, wherein the at least two irradiation units are laser arrays.

6. The measuring system according to claim 1, wherein the at least one camera and the at least one distance sensor are integrated in a single measuring device.

7. The measuring system according to claim 4, wherein the photodiode and/or the photo resistor of the power measuring device are integrated in an Ulbricht sphere.

8. A measuring system for equipping or retrofitting an additive manufacturing device that solidifies building material at a working plane, wherein the additive manufacturing device includes at least two laser arrays, the measuring system comprising:
- a positioning unit and a measuring head holder movably mounted on the positioning unit;
- a camera for capturing an image of an element located above the camera and for determining and evaluating at least one of (a) radiation emitted by at least one of the laser arrays; (b) a position of at least one of the laser arrays; and (c) an orientation of at least one of the laser arrays; and
- a distance sensor that measures a distance between the distance sensor and another element located above the distance sensor,
- wherein the at least one camera and the at least one distance sensor are mounted in a fixed position relative to one another on the measuring head holder.

9. A measuring system for a device for manufacturing a three-dimensional object by selective layerwise solidification of a building material, wherein the device includes a plurality of irradiation units, the measuring system comprising:
- a positioning unit;
- a measuring head holder movably mounted on the positioning unit, the measuring head holder including a camera, a power measuring device, and a distance sensor each mounted in a fixed position relative to each other,
- wherein the camera captures an image of the irradiation units in a light-emitting state and converts the image into an image signals via an image sensor, the image signal evaluating at least one of (a) radiation emitted by the irradiation units; (b) an orientation of the irradiation units within the device; and (c) an orientation of the irradiation units relative to each other;
- wherein the power measuring device determines radiation power emitted by the irradiation units by converting an optical power of the irradiation units into a power signal; and
- wherein the distance sensor determines a vertical distance to an element located above the distance sensor and creates a distance signal representing the vertical distance.

* * * * *